(12) United States Patent  (10) Patent No.: US 8,083,067 B2
Pomykala, Jr. et al.  (45) Date of Patent: Dec. 27, 2011

(54) METHOD FOR THE SEPARATION OF OVERLAPPING DENSITY POROUS MATERIALS FROM LESS POROUS MATERIALS

(75) Inventors: Joseph A. Pomykala, Jr., Shorewood, IL (US); Bassam J. Jody, Tinley Park, IL (US); Edward J. Daniels, Orland Park, IL (US); Jeffrey S. Spangenberger, Plainfield, IL (US); Scott T. Lockwood, Joliet, IL (US)

(73) Assignee: UChicago Argonne, LLC, Chicago, IL (US)

( * ) Notice: Subject to any disclaimer, the term of this patent is extended or adjusted under 35 U.S.C. 154(b) by 692 days.

(21) Appl. No.: 11/733,462

(22) Filed: Apr. 10, 2007

(65) Prior Publication Data

US 2008/0251426 A1  Oct. 16, 2008

(51) Int. Cl.
*B07B 1/00* (2006.01)

(52) U.S. Cl. .............................. 209/4; 209/172; 209/173

(58) Field of Classification Search .......... 209/162–172, 209/4, 9, 172.5, 173
See application file for complete search history.

(56) References Cited

U.S. PATENT DOCUMENTS

| 4,591,431 A * | 5/1986 | Sinha ............................... 209/3 |
| 5,653,867 A * | 8/1997 | Jody et al. ..................... 209/164 |
| 2005/0139529 A1* | 6/2005 | Mannes ........................ 209/715 |

* cited by examiner

*Primary Examiner* — Joseph C Rodriguez
*Assistant Examiner* — Kalyanavenkateshware Kumar
(74) *Attorney, Agent, or Firm* — Joan Pennington

(57) ABSTRACT

Enhanced methods for separating of overlapping density porous materials are provided. The methods of the invention exploit the differences in the porosity of porous feed materials compared to that of the solid plastics. In the first stage, air is forced out of the pores of a porous feed material. In the second stage, a solution, having the appropriate density, is forced into the pores. This increases the density of the porous material relative to the density of the solid plastics. As a result, the porous material can be made to sink, while the solid plastics continue to float.

14 Claims, 3 Drawing Sheets

300

```
┌─────────────────────────────────────────────────────────┐
│ PROVIDE STAGE 1 AQUEOUS SOLUTION                        │
│ (AQUEOUS SOLUTION OF WATER, SALT, E.G. SODIUM CHLORIDE, │
│ AND SURFACTANT, E.G. HAVING SPECIFIC GRAVITY BETWEEN 1.0│
│ AND 1.20, AND SURFACE TENSION VALUE BETWEEN 25 AND 40   │
│ DYNE/CM)                                                │
│ 302                                                     │
└─────────────────────────────────────────────────────────┘
                            │
                            ▼
┌─────────────────────────────────────────────────────────┐
│ MAINTAIN FEED MATERIAL IN BOILING SOLUTION FOR SELECTED │
│ TIME                                                    │
│ 304                                                     │
└─────────────────────────────────────────────────────────┘
                            │
                            ▼
┌─────────────────────────────────────────────────────────┐
│ TRANSFER FEED MATERIAL TO STAGE 2 AQUEOUS SOLUTION      │
│ 306                                                     │
└─────────────────────────────────────────────────────────┘
                            │
                            ▼
┌─────────────────────────────────────────────────────────┐
│ SEPARATELY REMOVE POROUS MATERIALS (RUBBER              │
│ COMPOUNDS, FOAMS, AND WOODS) AND PLASTICS               │
│ 308                                                     │
└─────────────────────────────────────────────────────────┘
```

FIG. 3

METHOD FOR THE SEPARATION OF OVERLAPPING DENSITY POROUS MATERIALS FROM LESS POROUS MATERIALS

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to an improved method for the separation of overlapping density porous materials.

DESCRIPTION OF THE RELATED ART

Recycling of different types of polymers has increased in recent years. Processes for separating different polymer types have become increasingly important. Separation of solids using differences in their densities is a simple, economical and effective technique. A liquid whose density is between the densities of two solids can be used as the working medium. The solid with the lesser density floats and the solid with the higher density sinks resulting in the separation of the mixture. However, materials that have similar or overlapping densities, such as acrylonitrile butadiene styrene, ABS, and high impact polystyrene, HIPS, cannot be separated in high purities by this simple and inexpensive technique. Similarly, wood and various types of rubber materials that are generally found as contaminants in post consumer or post manufacturing waste plastics, have densities that overlap with the densities of the plastics and therefore can not be separated by this technique.

Various techniques are known for separating mixed plastics, for example, using gravity separation and froth flotation techniques. The present inventors have provided improvements over the prior art having previously developed effective technologies for separating mixed plastics using gravity separation and froth flotation techniques, and received U.S. Pat. Nos. 6,599,950 and 5,653,867.

U.S. Pat. No. 6,599,950 to Bassam J. Jody et al. issued Jul. 29, 2003, and assigned to the present assignee, discloses a method of separating a portion of acrylonitrile-butadiene-styrene (ABS) from a mixture containing ABS and for separating a portion of ABS and polycarbonate (PC) from a mixture of plastics containing ABS and PC. The method includes shredding and/or granulating the mixture of plastics containing ABS and PC to provide a selected particle size; sequentially dispersing the shredded mixture of plastics in a series of aqueous solutions having different specific gravities and separating the floating fraction until the desired separation is obtained. Surface tension and pH are also variable to be controlled.

U.S. Pat. No. 5,653,867 to Bassam J. Jody et al. issued Aug. 5, 1997, and assigned to the present assignee, discloses a method of separating acrylonitrile butadiene styrene (ABS) and high impact polystyrene (HIPS) plastics from each other. The ABS and HIPS plastics are shredded to provide a selected particle size. The shredded particles of the ABS and HIPS plastics are applied to a solution having a solution density in a predefined range between 1.055 gm/cm$^3$ and 1.07 gm/cm$^3$, a predefined surface tension in a range between 22 dynes/cm to 40 dynes/cm and a pH in the range of 1.77 and 2.05. In accordance with a feature of the invention, the novel method is provided for separating ABS and HIPS, two solid thermoplastics which have similar densities by selectively modifying the effective density of the HIPS using a binary solution with the appropriate properties, such as pH, density and surface tension, such as a solution of acetic acid and water or a quaternary solution having the appropriate density, surface tension, and pH.

This developed technology has been used to recover polymer product fractions from various waste streams that contain plastics. The present inventors have found that many of these streams contain, in addition to plastics, various types of wood, foam, and rubber. Because these materials are not compatible with plastics they degrade the properties of the recovered plastics and complicate their processability. Therefore they must be removed or minimized. Thus, a need exists for the removal of these other constituents, mainly the wood, foam, and rubber from the desired polymer product.

A principal aspect of the present invention is to provide enhanced methods for separating overlapping density porous materials from plastics.

Other important aspects of the present invention are to provide such enhanced methods for separating of overlapping density porous materials substantially without negatively impacting the properties of the plastics and in ways that overcome some of the disadvantages of prior art arrangements.

As used in the following description and claims, the term "porous material" should be understood to include semi-porous materials, and rubber compounds, woods, and foams.

SUMMARY OF THE INVENTION

In brief, enhanced methods and apparatus for separating of overlapping density porous materials are provided. The methods of the invention exploit the differences in the porosity of porous feed materials compared to that of the solid plastics. When the pores of the porous or semi-porous materials, such as rubber compounds, woods and foams are filled or partially filled with air such materials have a density, which overlaps with that of various plastics, and as a result sink or float with the plastics.

Methods of the invention are implemented in two steps or stages. In the first stage, air is forced out of the pores of a porous feed material. In the second stage, a liquid such as water or a solution is forced into the pores to replace air. This increases the density of the porous material relative to the density of the solid plastics. As a result, the porous material can be made to sink, while the solid plastics continue to float.

In accordance with features of the invention, a number of methods has been found effective in removing the air out of the pores including pulling a vacuum on the material with or without heating (heating speeds up the process), heating under ambient pressure, flushing with steam and then allowing the steam to condense inside the pores, heating or boiling the material in a liquid such as water or in an aqueous solution containing a salt such as sodium chloride and squeezing the material while in water or in a solution to force the air out and have displaced by the solution. One method selected for implementing the first stage process, based on cost and ease of operation consideration, to force air out of the pores or voids in the porous material includes boiling the feed material in a liquid or in a brine solution for a set time period. Reducing the surface tension of the liquid or the solution, by adding surfactants and/or increasing the solution temperature, accelerates the rate at which the air will be replaced with the liquid or the solution.

In accordance with features of the invention, the first stage solution includes an aqueous solution, for example, containing water or water and a dissolved salt, such as sodium chloride. The aqueous solution optionally includes a surfactant. The aqueous solution may be heated to accelerate the rate at which the aqueous solution displaces air.

In accordance with features of the invention, the second stage solution includes an aqueous solution, for example, containing water or water and a dissolved salt, such as sodium chloride. The second stage solution is preferably maintained at ambient temperature. Its specific gravity is selected intermediate between the specific gravity of the solid plastics and the porous material impregnated with the solution from stage 1. Its surface tension is adjusted, when necessary, using surfactants to facilitate the wetting of the porous species in the mixture so that they sink

BRIEF DESCRIPTION OF THE DRAWINGS

The present invention together with the above and other objects and advantages may best be understood from the following detailed description of the preferred embodiments of the invention illustrated in the drawings, wherein:

FIG. 3 is a process flow diagram illustrating exemplary processing steps of the process for the separation of overlapping density porous materials in accordance with the preferred embodiment.

DETAILED DESCRIPTION OF THE PREFERRED EMBODIMENTS

Figure 1:
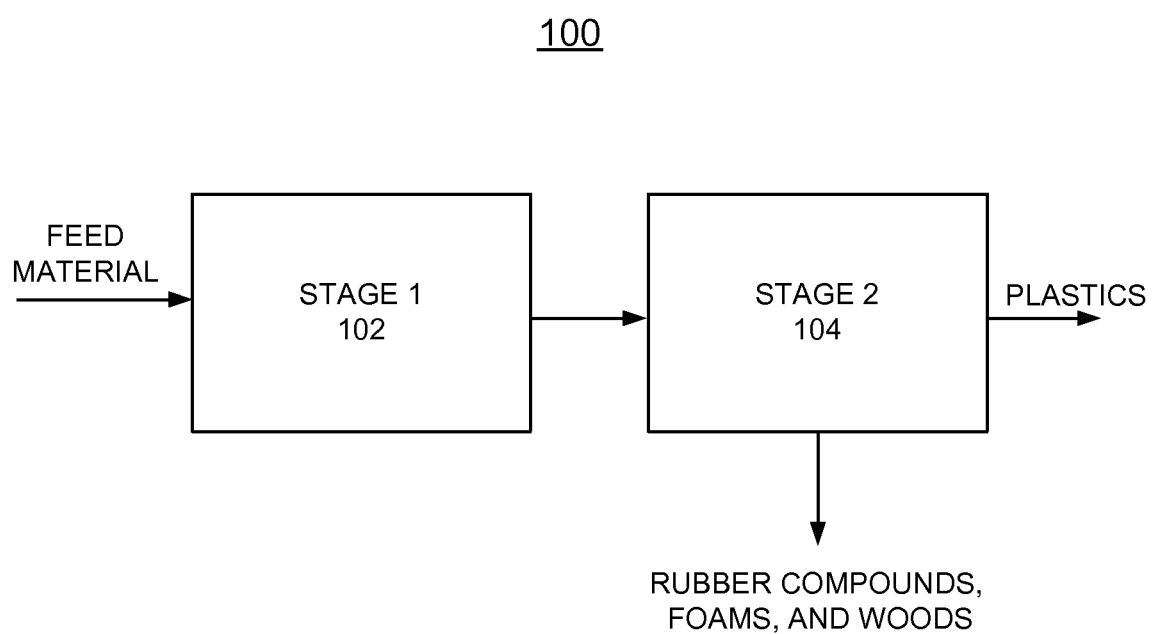
FIG. 1 is a schematic diagram illustrating exemplary stages for performing sequential steps of the process for the separation of overlapping density porous materials in accordance with the preferred embodiment.

Having reference now to the drawings, in FIG. 1, there is shown a schematic and block diagram representation of a material processing system used for the effective separation of porous materials whose density overlaps with the density of less porous materials in accordance with the preferred embodiment and generally designated by the reference numeral 100.

In accordance with features of the invention, the differences in the porosity of porous materials and solid plastics in the feed material are exploited. When the pores of the porous or semi-porous rubber, wood and foam are filled or partially filled with air, these porous materials have a density that generally overlaps with the density of many of the plastics encountered in waste streams. The process of the invention includes two steps. In the first step the air is forced out of the pores. In the second step, a solution is forced into the pores. This increases the density of the porous material relative to the density of the solid plastics. Then the porous material is made to sink, while the solid, less porous or non-porous plastics continue to float.

The material processing system 100 includes a first stage 1, 102, receiving and processing the feed material. In stage 1, 102, the feed material is processed to force the air out of the pores of a porous material included in the received feed material. The processed feed material is then transferred to a second stage 2, 104. In stage 2, 104, the feed material is processed to force a liquid such as water or a solution into the pores. This increases the density of the porous material relative to the density of the solid plastics. In stage 2, 104, the porous material advantageously is made to sink, while the solid plastics continue to float in a media, such as a water/salt solution, having a density intermediate to the densities of the solid plastics and the porous material that has been impregnated with water or with a solution in stage 1, 102. In stage 2, 104, the porous material is removed, for example, from a bottom drain indicated by an arrow labeled rubber compounds, foams, and woods. In stage 2, 104, the plastic material is removed, for example, from an upper discharge port indicated by an arrow labeled plastics.

Figure 2:
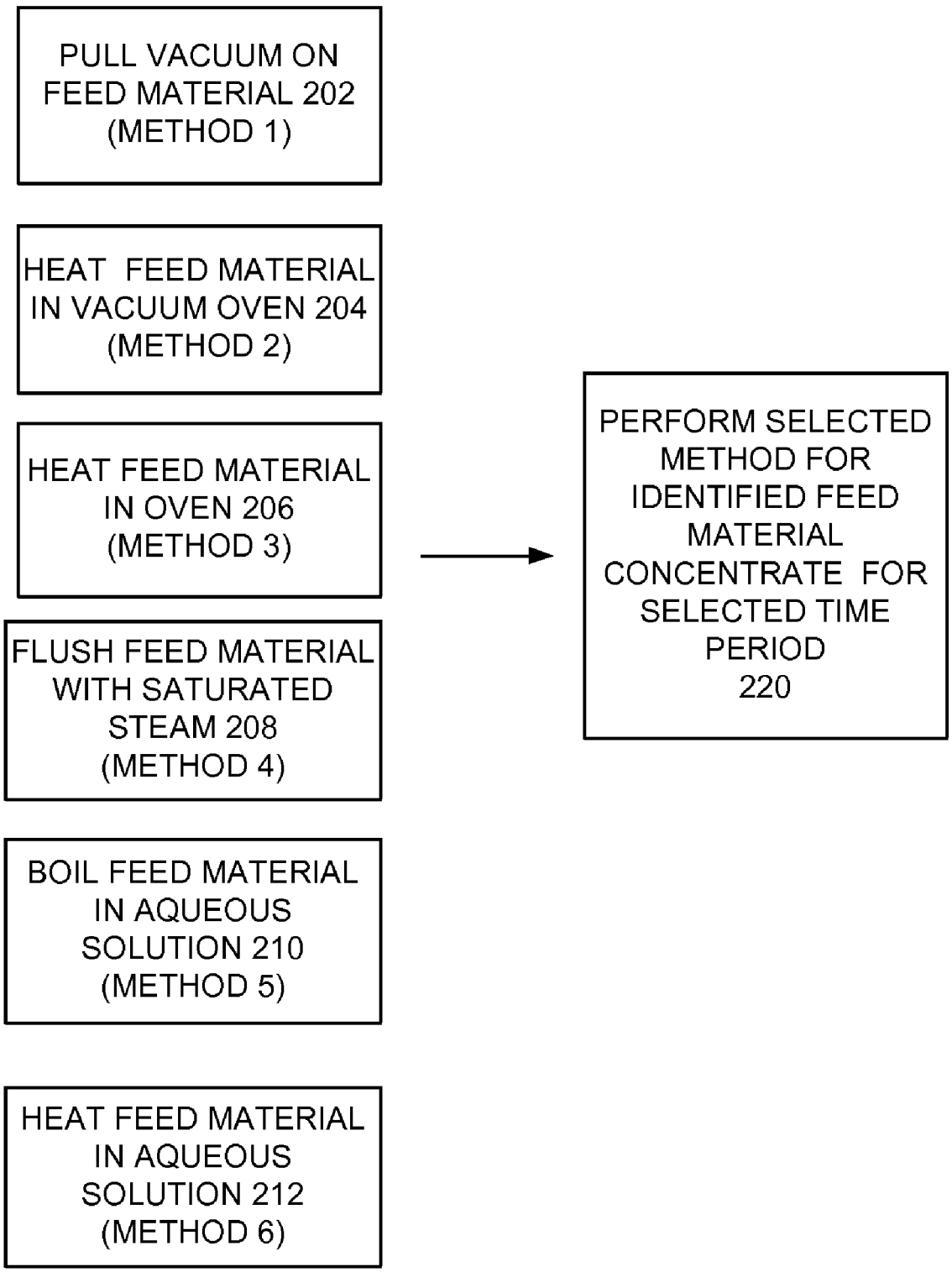
FIG. 2 is a process flow diagram illustrating exemplary processing methods of stage 1 of FIG. 1 for removing air from voids of the porous materials methods in accordance with the preferred embodiment.

Referring now to FIG. 2, there is shown a process flow diagram illustrating exemplary processing methods of stage 1, 102 for removing air from voids of the porous materials methods in accordance with the preferred embodiment and generally designated by the reference numeral 200. One of a plurality of exemplary process methods include a method 1 to pull a vacuum on the material as indicated at a block 202, a method 2 of heating the material in a vacuum oven or in an evacuated chamber as indicated at a block 204, a method 3 of heating the material in an oven or a chamber under ambient pressure, as indicated at a block 206, a method 4 of flushing the material with saturated steam and then allowing the steam to condense inside the pores, as indicated at a block 208, a method 5 of boiling the material in a liquid such as water or in an aqueous solution as indicated at a block 210, and a method 6 of heating in an aqueous solution as indicated at a block 212. A selected method is performed for an identified feed material for a selected time period as indicated at a block 220.

In accordance with features of the invention, all of these methods worked for forcing the air out. The practicality and cost effectiveness of these methods is governed by what it takes to keep the air out until the evacuated air from the pores is replaced by a solution, or water.

Referring now to FIG. 3, there is shown a process flow diagram illustrating exemplary processing steps of the process for the separation of overlapping density porous and less porous or nonporous materials in accordance with the preferred embodiment and generally designated by the reference numeral 300. As shown in FIG. 3, the method 5 of boiling the material in an aqueous solution is implemented for evacuating the air from the pores. As indicated at a block 302, a liquid such as water or an aqueous solution is provided, for example, including water, salt, such as sodium chloride, and optionally a surfactant, for example, having a specific gravity between 1.0 and 1.20, and a surface tension value between 25 and 40 dyne/cm. The feed material is maintained in the boiling solution for a selected time as indicated at a block 304. Then the feed material is transferred to an aqueous solution of stage 2 as indicated at a block 306. Then the porous materials, such as rubber compounds, foams, and woods, and plastics are separately removed as indicated at a block 308.

Experimental Results

The inventors have shown by experiments that evacuating the air from the pores can be achieved by a number of processes including: 1. Introducing the mixed material into a hot or boiling solution to cause the air to heat up, expand and leave the pore and be replaced with solution. 2. Pulling a vacuum on the mixed material to force the air to expand out of the pores. 3. Applying pressure on the porous material to compact it and force the air out.

Boiling the mixed material in water or in aqueous solution containing water and a salt (stage 1) such as sodium chloride proved to be the most convenient and economical. Using other liquids, instead of water, can achieve the same objective. However, water is the preferred choice because it is most environmentally friendly and economical.

After the mixture is allowed to sit for a few minutes in the hot aqueous solution of stage 1, the mixed material is transferred, while hot and while retaining the solution it picked up in the first stage, to a tank containing a solution of stage 2 that is used to separate the porous wood, rubber and foam from the solid plastics. This tank is maintained at room temperature. The liquid inside the pores cools, allowing more of the solution in the tank to fill in the pores and increase the density of the porous material further. It is preferable to use water solutions containing the salt in both the hot and cold tanks in order to avoid having to separate the different solutions later. We have referred to the cold tank (stage 2) as the quench process.

Initial Bench Scale Testing Results

A series of experiments were conducted to remove the wood, foams and rubber species from polyolefin's (polypropylene and polyethylene) on the bench scale. Bench scale tests were conducted on methods to remove the air from the voids of the materials, stage 1, from the more porous materials. These methods included the following: Pulling a vacuum on the material (method 1); Heating the material in a vacuum oven (method 2); Heating the material in an oven (method 3); Flushing the material with saturated steam (method 4); Boiling in an aqueous solution (method 5); and Heating in an aqueous solution (method 6).

All of these methods were then followed in each case by quenching the material, stage 2, in an aqueous solution. Each of these methods was successfully tested on the polyolefin fraction recovered from shredder residue. This polyolefin fraction contained as much as 40% wood, rubber and foam and the rest is plastics. Our target was to remove over 99% of the wood and over 90% of the rubber and foam.

Each of the bench scale experiments achieved the objective given the necessary treatment time, temperature or vacuum.

Large Scale Experiments

The "boil/quench" method using aqueous solutions was then selected for further testing at a larger scale. Even though all of the above described methods obtained the same desired decrease in the concentration of contaminates, method 5 was tested on over four tons of material. Over two tons of material were produced from the starting material and contained consistently over 95 weight percent polyolefin's.

Methods 1 and 2 were not selected for large scale testing due to the equipment costs of keeping the material under vacuum while transferring to stage 2. Method 3 was not selected due to the cost of the oven as well as on additional equipment required to keep the air out during transfer to the "quench" tank. Method 4 is still undergoing testing to determine the time it takes to replace the air in the voids with the saturated steam and to affect the condensation of the steam to fill the voids to guard against air filling up the pores again.

During the course of our research we have recovered the following fractions from shredder residue:
1. A polymer concentrate fraction;
2. Various fractions recovered from the density separations of the polymer concentrate from a specific gravity of 1.0 g/cc to 1.21 g/cc;
3. A mixed polypropylene, polyethylene (polyolefin) fraction;
4. A filled acrylonitrile butadiene styrene (ABS) fraction (ABS with a specific gravity greater than 1.067 g/cc); and
5. A mixed unfilled ABS (ABS with specific gravity less than 1.067 g/cc), polystyrene (PS) fraction.
6. A mixed polycarbonate (PC)-ABS/PC copolymer fraction All of these fractions have had various concentrations of the contaminants, such as wood, rubber and foam, and we have developed processes to remove these contaminants the wood, foams, and rubber compounds from these recovered fractions.
1. For the above method 5 the separation successfully recovered a polyolefin's fraction that was 95 weight percent polyolefin's with the following separation conditions tested.
    a. The solution in stage 1 was water or an aqueous solution of water, a salt such as sodium chloride and a surfactant, having a specific gravity between 1.0 and 1.20 g/cc and a surface tension between 25 and 40 dyne/cm.
    b. The time that the material remained in the boiling solution was successfully tested at ~3 minutes to greater than 60 minutes.
    c. The solution in stage 2 was an aqueous solution of water, a salt such as sodium chloride and a surfactant, having a specific gravity between 1.0 and 1.20 g/cc and a surface tension between 25 and 40 dyne/cm.
    d. Substantial amounts of wood, foam and rubber sunk in the boil tank.
    e. By transferring only the material floating in stage 1 to stage 2 the overall loss of polyolefin plastics was 15 weight percent.
    f. By transferring all material from stage 1 to stage 2 the loss of the polyolefin plastics was reduced to less than 5 weight percent.
    g. Removal of wood, in both cases e and f was 98-99.5%
    h. Removal of rubber in both cases e and f was 85-95%
    i. Loss of plastics was 3-15%
2. Method 5 was successfully tested on the filled ABS fraction recovered from shredder residue to remove the wood and rubber compounds from the filled ABS.
    a. The solution in stage 1 was an aqueous solution of water, a salt such as sodium chloride and a surfactant, having a specific gravity between 1.0 and 1.20 g/cc and a surface tension between 25 and 40 dyne/cm.
    b. The time that the material remained in the boiling solution was successfully tested at ~3 minutes to greater than 60 minutes.
    c. The solution in stage 2 was an aqueous solution of water, a salt such as sodium chloride and a surfactant, having a specific gravity between 1.10 and 1.20 g/cc and a surface tension between 25 and 40 dyne/cm.
    d. Removal of wood was 98-99.5%
    e. Removal of rubber was 30-95%
    f. Loss of plastics was 3-5%
3. Method 5 was successfully tested on the unfilled ABS/PS fraction recovered from shredder residue to remove the wood and rubber compounds from the unfilled ABS/PS.
    a. The solution in stage 1 was an aqueous solution of water, a salt such as sodium chloride and a surfactant, having a specific gravity between 1.0 and 1.20 g/cc and a surface tension between 25 and 40 dyne/cm.
    b. The time that the material remained in the boiling solution was successfully tested at ~3 minutes to greater than 60 minutes.
    c. The solution in stage 2 was an aqueous solution of water, a salt such as sodium chloride and a surfactant, having a specific gravity between 1.065 and 1.20 g/cc and a surface tension between 25 and 40 dyne/cm.
    d. Removal of wood was 98-99.5% e. Removal of rubber was 30-50% f. Loss of plastics was 3-5%

4. Method 5 was successfully tested on the entire polymer concentrate (which contained over 20 different plastics and various types of wood and rubber) recovered from shredder residue and various density cuts of the polymer concentrate to remove the wood and rubber compounds from the polyolefin's, filled ABS, unfilled ABS and PS.

a. The solution in stage 1 was an aqueous solution of water, a salt such as sodium chloride and a surfactant, having a specific gravity between 1.0 and 1.20 g/cc and a surface tension between 25 and 40 dyne/cm.

b. The time that the material remained in the boiling solution was successfully tested at ~3 minutes to greater than 60 minutes.

c. The solution in stage 2 was an aqueous solution of water, a salt such as sodium chloride and a surfactant, having a specific gravity between 1.10 and 1.20 g/cc and a surface tension between 25 and 40 dyne/cm.

d. Removal of wood was 98-99.5% e. Removal of rubber was 30-90% f. Loss of plastics was 3-5%

We anticipate this process being successfully applied to various plastics contaminated with materials such as wood, rubber, or foams but these other plastics from various streams have not been tested to date.

SPECIFIC EXAMPLES

Example 1

Separation of Wood and Rubber from the Polyolefin Concentrate Fraction that was Recovered from Shredder Residue Objective: Remove wood and rubber from the recovered polypropylene and polyethylene.

A fraction containing the unfilled polyolefin's was separated from a polymer concentrate derived from shredder residue. This fraction contained about 25% polypropylene, 25% polyethylene, 25% mixed rubber compounds, 5% wood and 20% other materials. The rubber portion is made of several types of elastomers and foamed materials.

Sample of this fraction was introduced into a tank containing a boiling aqueous solution with a specific gravity of 1.0 g/cc and surface tension of 35 dyne/cm. After 15 minutes the entire sample was then transferred to an adjacent tank maintained at room temperature and containing an aqueous solution with a specific gravity of 1.0 g/cc and surface tension of 35 dyne/cm. Over 99% of the wood and over 90% of the rubber sank in the second stage along with over 96% of the "other "materials". Less than 5% of the polyethylene and polypropylene sank. The floaters consisted of over 95% polyethylene and polypropylene. Boil time was reduced to 5 minutes and all material floating and sinking in boil were transferred to quench to increase yield.

This example was duplicated in numerous bench scale tests. It was also duplicated in many large scale tests to produce 4000 lbs of the Polyolefin product.

Benefits: This process removes wood, rubber and most of the other materials from the polyolefin concentrate fraction.

Example 2

Separation of Wood and Rubber from the Filled ABS Concentrate Fraction that was Recovered from Shredder Residue Objective: Remove wood and rubber from the recovered filled ABS A fraction containing the filled ABS was separated from a polymer concentrate derived from shredder residue. This fraction contained about 50% filled ABS, 25% mixed rubber compounds, 5% wood and 20% other plastics. The rubber portion is made of several types of elastomers and foamed materials.

Sample of this fraction was introduced into a beaker containing a boiling aqueous salt solution with a specific gravity of 1.10 g/cc and surface tension of 35 dyne/cm. After 5 minutes the entire sample was then transferred to another adjacent beaker containing an aqueous solution with a specific gravity of 1.10 g/cc and surface tension of 35 dyne/cm at room temperature. About 98% of the wood and over 70% of the rubber sank. Less than 3% of the filled ABS sank. Salt/surfactant solution was used as the boil, stage 1, and salt/surfactant solution was used as the quench, stage 2, with time in boil now between 5-15 minutes.

This example was duplicated in numerous bench scale tests.

Benefits: This process removes wood, and rubber from the filled ABS fraction.

Example 3

Separation of Wood and Rubber from the Unfilled ABS/PS Concentrate Fraction that was Recovered from Shredder Residue Objective: Remove wood and rubber from the recovered unfilled ABS/PS.

A fraction containing the unfilled ABS/PS was separated from a polymer concentrate derived from shredder residue. This fraction contained about 70% unfilled ABS/PS, 12% mixed rubber compounds, 8% wood and 10% other plastics. The rubber portion is made of several types of elastomers and foamed materials.

Sample of this fraction was introduced into a beaker containing a boiling aqueous solution with a specific gravity of 1.00 g/cc and surface tension of 35 dyne/cm. After 5 minutes the entire sample was then transferred to another adjacent beaker containing an aqueous solution with a specific gravity of 1.067 g/cc and surface tension of 35 dyne/cm at room temperature. About 99% of the wood and over 40% of the rubber sank. Less than 5% of the unfilled ABS/PS sank. Salt/surfactant solution was used as the boil, stage 1, and salt/surfactant solution was used as the quench, stage 2, with time in boil now between 5-15 minutes.

This example was duplicated in numerous bench scale tests.

Benefits: This process removes wood, and some rubber from the filled ABS fraction.

Example 4

Separation of Wood and Rubber from the Polymer Concentrate Fraction that was Recovered from Shredder Residue Objective: Remove wood and rubber from the recovered polymer concentrate.

The polymer concentrate derived from shredder residue contained about 40% plastics (a mixture of over 20 types of plastics), 40% mixed rubber compounds, 5% wood and 15% other materials. The rubber portion is made of several types of elastomers and foamed materials.

Sample of this fraction was introduced into a beaker containing a boiling aqueous salt solution with a specific gravity of 1.10 g/cc and surface tension of 35 dyne/cm. After 5 minutes the entire sample was then transferred to another adjacent beaker containing an aqueous solution with a specific gravity of 1.10 g/cc and surface tension of 35 dyne/cm at room temperature. About 98% of the wood and over 95% of the rubber sank. The recovery of the unfilled PP/PE was about 95% and recovery of the filled ABS, unfilled ABS, and PS was 90%. Surfactant solution and a salt/surfactant solution were used as the boil, stage 1, and salt/surfactant solution was used as the quench, stage 2, with time in boil now between 5-15 minutes.

This example was duplicated in numerous bench scale tests.

Benefits: This process removes wood, and rubber from the polymer concentrate and recovers the unfilled PP/PE, filled ABS, unfilled ABS and PS which need further processing to separate them from one another.

In brief summary, a lower limit of stage 1 processing time appears to be ~3 minutes, while an upper limit seems to be anything greater than 3 minutes.

While the present invention has been described with reference to the details of the embodiments of the invention shown in the drawing, these details are not intended to limit the scope of the invention as claimed in the appended claims.

What is claimed is:

1. A method for separating of overlapping density porous materials in feed material in a material processing system used for separation of porous materials, said method comprising the steps of:
    forcing air from pores of a porous material in the feed material by heating the feed material in water in a first processing stage of the material processing system;
    forcing a solution into the pores to increase density of the porous material in a second processing stage of the material processing system; and
    separating the increased density porous feed material from the feed material with the increased density porous feed material sinking and being removed from a bottom drain.

2. The method for separating of overlapping density porous materials in feed material as recited in claim 1 wherein forcing air from pores of a porous material in the feed material by heating the feed material in water in a first processing stage of the material processing system includes the steps of boiling the feed material in an aqueous solution.

3. The method for separating of overlapping density porous materials in feed material as recited in claim 1 wherein forcing air from pores of a porous material in the feed material by heating the feed material in water in a first processing stage of the material processing system includes the steps of heating the feed material in an aqueous solution.

4. The method for separating of overlapping density porous materials in feed material as recited in claim 1 wherein forcing air from pores of a porous material in the feed material by heating the feed material in water in a first processing stage of the material processing system includes the steps of providing a selected aqueous solution and boiling the feed material in the selected aqueous solution.

5. The method for separating of overlapping density porous materials in feed material as recited in claim 4 includes providing the selected aqueous solution containing water and a salt.

6. The method for separating of overlapping density porous materials in feed material as recited in claim 4 includes providing the selected aqueous solution containing water and sodium chloride.

7. The method for separating of overlapping density porous materials in feed material as recited in claim 4 includes providing the selected aqueous solution containing the water, a salt and a surfactant, having a specific gravity in a range between 1.0 and 1.20 g/cc and a surface tension in a range between 25 and 40 dyne/cm.

8. The method for separating of overlapping density porous materials in feed material as recited in claim 4 wherein boiling the feed material in the selected aqueous solution includes boiling the feed material in the selected aqueous solution for a minimum time period of three minutes.

9. The method for separating of overlapping density porous materials in feed material as recited in claim 1 wherein the porous material in the feed material having pores filled or partially filled with air, have an initial density overlapping plastic materials in the feed material, and wherein separating the increased density porous feed material from the feed material includes separating sinking increased density porous material from floating solid plastic materials.

10. The method for separating of overlapping density porous materials in feed material as recited in claim 1 wherein forcing a solution into the pores to increase density of the porous material in a second processing stage of the material processing system further includes transferring the feed material having increased density porous feed material to a second stage aqueous solution.

11. The method for separating of overlapping density porous materials in feed material as recited in claim 10 includes providing the second stage aqueous solution containing water and a salt.

12. The method for separating of overlapping density porous materials in feed material as recited in claim 10 includes providing the second stage aqueous solution containing water and sodium chloride.

13. The method for separating of overlapping density porous materials in feed material as recited in claim 10 includes maintaining the second stage solution at about ambient temperature.

14. The method for separating of overlapping density porous materials in feed material as recited in claim 10 includes maintaining the second stage aqueous solution at an ambient temperature without heating the second stage aqueous solution.

* * * * *